United States Patent Office 3,281,363
Patented Oct. 25, 1966

3,281,363
BISMUTH-CONTAINING GARNETS AND
THEIR PREPARATION
Seymour Geller, Morristown, N.J., and Mathias A. Gilleo,
Menlo Park, Calif., assignors to Bell Telephone Laboratories, Incorporated, New York, N.Y., a corporation of New York
Filed July 10, 1963, Ser. No. 293,963
7 Claims. (Cl. 252—62.5)

This invention relates to synthetic garnets and their preparation.

The discovery of synthetic garnets, and in particular yttrium iron garnet, has provoked new interest in the field of ferrimagnetic materials and has resulted in more useful and effective devices, particularly those employed for microwave communications. The garnet materials, aside from possessing exceptional ferrimagnetic properties, do not tolerate distortions in symmetry and generally form only according to precise stoichiometry. This property permits a degree of reproducibility in the synthesis of these materials which is notably lacking in the synthesis of spinel ferrites.

Since this discovery there have been several attempts toward substitutional modifications of yttrium iron garnet in an effort to discover enhanced or new characteristics. As a result the art has developed, characteristically by systematic and empirical methods, a catalogue of various elements which will substitute into the garnet structure. Certain of the substituted garnets have useful and unexpected properties such as those described and claimed in United States Patents 3,006,854 and 3,006,855, both issued October 31, 1961 and application Serial No. 183,201 filed March 28, 1962.

This invention is directed to the discovery that when bismuth is substituted into synthetic garnets in appreciable quantities new and unobvious characteristics of the material are obtained. More particularly, when bismuth is substituted for yttrium in yttrium iron garnet the temperature necessary to produce the garnet phase is reduced from fifty degrees up to several hundred degrees. Similar results are found with bismuth substitutions in other synthetic garnets. This dramatic reduction in the temperature of formation of the stable garnet phase is not known to be obtainable by any other garnet substitution with comparable results. The profound technological implications of this unexpected characteristic will be obvious to those concerned with the commercial preparation of garnet materials.

These and other aspects of the invention will become more apparent from the following detailed description of the invention considered in conjunction with the drawing in which.

Figure 4:
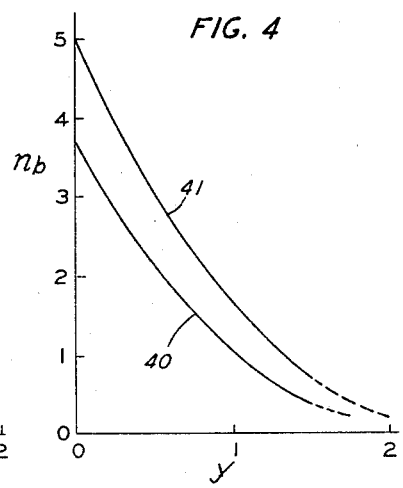
Figure 5:
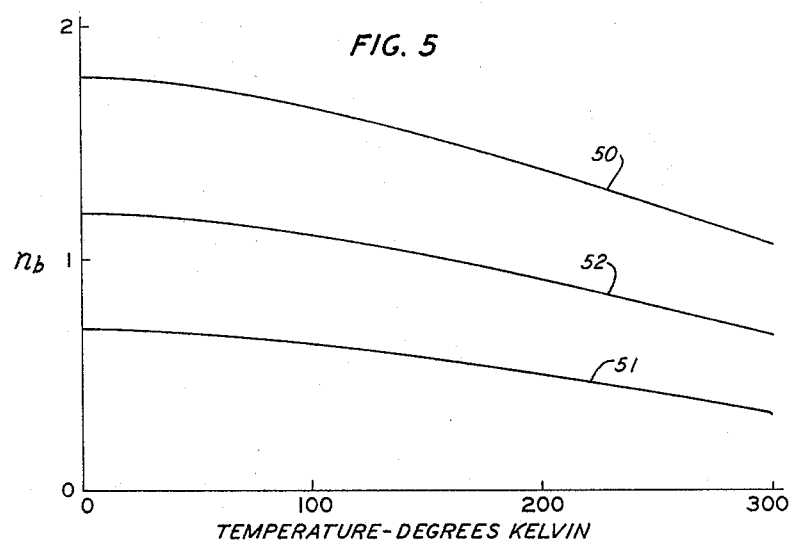

FIG. 4 is a plot of the spontaneous magnetization in Bohr-Magnetons per formula unit vs. composition for bismuth-substituted yttrium iron aluminum garnets; and FIG. 5 is a plot of the spontaneous magnetization in Bohr-Magnetons per formula unit vs. temperature for 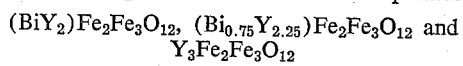 $(Bi_{0.25}Y_{2.75})Fe_4AlO_{12}$, $(Bi_{0.25}Y_{2.75})Fe_{3.75}Al_{1.25}O_{12}$, and $(Bi_{0.25}Y_{2.75})Fe_{3.50}Al_{1.5}O_{12}$.

Several garnet materials are known to exist or can be made synthetically. Of these the accepted prototype compound is yttrium iron garnet. For convenience this description is largely in terms of this material. It will be apparent that bismuth substitutions are beneficially made in all magnetic garnets.

In the substitution of bismuth into the garnet structure the bismuth ions enter the $c$-site which means that in yttrium iron garnet it substitutes for yttrium giving a garnet having the formula:

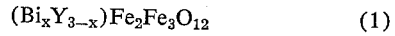
$$(Bi_xY_{3-x})Fe_2Fe_3O_{12} \qquad (1)$$

Because of its large size a total substitution of bismuth in the $c$-site is not possible. For this reason the maximum bismuth substitution obtainable is 50% or 1.5 atoms per formula unit.

The advantages attendant on the substitution of bismuth into garnet materials become evident for substitutions as small as 0.05 bismuth atom. Consequently this invention is concerned with bismuth substituted garnet materials wherein the minimum number of bismuth ions is 0.05. However certain considerations, such as the relative cost of yttrium vs. bismuth make the higher bismuth proportions more attractive. Accordingly, a preferred minimum is 0.1. For certain purposes as will be apparent, a minimum of 0.5 is indicated. As stated, the maximum bismuth content for any magnetic garnet is 1.5.

As previously indicated the substitution of bismuth results in a striking depression in the temperature of formation of the garnet phase.

The following examples set forth experimental procedures followed for the purpose of determining optimum conditions under which a homogeneous single-phase garnet structure results. In accordance with certain of these procedures, it was expedient to calcine the starting materials typically for one hour with an increasing temperature over the range 500° C. to 900° C. and to successively grind and fire over a variety of temperatures and times. At times, as the procedures demanded, temperature was either increased or decreased, all operations being carried out as successive treatments of the same sample. After each firing, X-ray diffraction examination was made to determine the presence or absence of a second phase. While these procedures were useful for the purpose noted, it will be recognized that commercially a shorter schedule may be indicated. Such a schedule may be restricted to but a single firing or may utilize a calcining followed by one or more firings and regrindings.

From a commercial standpoint, the presence of one or more second phases is oftentimes not objectionable and may be a tolerable expedient. It has been determined experimentally that some garnet phase results for firing temperatures as low as 900° C. and firing times of the order of one-half hour and longer in typical compositions. Since the main practical advantage realized by the substitution of bismuth under these conditions is a reduction in permissive firing temperature, it is of little more than scientific interest that the garnet phase appears to be present in the compositions right up to their melting points. While the presence of bismuth in the garnet compositions has been observed to be of some secondary importance, per se, as, for example, in the obtaining of increased Curie temperature, etc., it is not believed that these advantages will dictate the use of firing temperatures exceeding those suitable in the preparation of the corresponding unsubstituted garnets. It having been observed that inclusion of as little as .05 part bismuth per formula unit results in a reduction of firing temperature of at least 50° C., a commercial firing temperature range of from 900° to 50° below the firing temperature of the unsubstituted garnet is indicated.

In general, the required firing temperature for obtaining prior art single-phase magnetic garnets such as yttrium iron garnet is between 1400° C. and 1500° C. Since a decrease in requisite firing temperature of at least 50° results on substitution of the minimum indicated bismuth, it would appear that in general the inventive procedures herein are carried out up to a maximum firing temperature of the order of 1350° C. A firing temperature of from 900° C. to 1350° C. is therefore indicated.

It has been stated that garnet phase occurs for firings at 900° C. for thirty minutes. Corresponding results are obtained at the maximum firing temperature of 1350° C. for periods as short as fifteen minutes. In general, maximum firing times are determined on the basis of expediency. Studies indicate the continuation of the garnet phase and, in fact generally an increase in the amount of garnet phase for firing times above thirty minutes. As is seen from the attached examples, such studies have been continued up to periods as long as sixty-five hours and longer firing periods are obviously effective.

Optimum conditions for obtaining a homogeneous single-phase product, independent of composition, cannot be prescribed. For any given system, i.e., YIG, firing temperature and/or time are reduced for corresponding increase in bismuth content. For the bismuth-substituted YIG system, single-phase materials are obtainable over a firing temperature range of from 900° C. to 1350° C. for periods of from eight hours to forty-eight hours, with low temperature corresponding with maximum bismuth content, i.e., 1.5 atoms per formula unit, and high temperature corresponding with minimum bismuth content, i.e., 0.05 atom per formula unit.

Experiments to date indicate particularly good properties in the bismuth-substituted YIG system for bismuth content of from .05 to .25 fired at a temperature in the range of from 1100° C. to 1350° C. for periods in the order of from eighteen to thirty-six hours. In general, density improved for higher temperature firing. This density is bulk density, i.e., indicating minimization of voids. High-bulk density results in line narrowing.

It was noted in one of the examples that an excess of bismuth was included in the starting ingredients to compensate for vaporization loss during firing. Such bismuth excess is not required unless a direct correspondence between starting and final composition is desired. As is well known, use of such excess may be avoided while still obtaining exact stoichiometry merely by sealing off the container during firing or even by use of an internally introduced bismuth-containing atmosphere. Where resort is not had to such expedient, bismuth excess of up to about 10 percent depending on firing temperature and time may be included. These considerations apply to all of the garnet systems herein.

The broad ranges set forth above apply to the other garnet compositions. Accordingly, bismuth-containing YIG compositions also including from 0 to 1.5 atoms of aluminum per formula unit are advantageously prepared over a temperature range of from 900° C. up to about 50° below the firing temperature for the non-bismuth-containing composition (in the aluminum system this is about 50° below 1450° C., or about 1400° C.). Firing times again range from a minimum of about thirty minutes at 900° C., or about fifteen minutes at 1400° C., up to the order of sixty-five hours or higher, as indicated.

Discussion of aluminum-substituted YIG systems herein has reference to compositions containing from .05 to 1.5 aluminum. While single-phase garnets may result with larger aluminum content, in fact for complete aluminum substitution, i.e., 5 atoms per formula unit, there is little interest in the magnetic properties of such compositions. A broad bismuth range for such substituted garnets is from .05 to 1.5, with a preferred range of from .05 to about .25. Where a single-phase homogeneous garnet is desired, firing should be carried out at a temperature within a range of about 1100° C. to about 1350° C., again with higher bulk density, i.e., fewer voids, resulting for the higher temperatures within that range. Preferred times here, too, are from eighteen to thirty-six hours. Considerable interest has already centered on aluminum-substituted YIG compositions containing about .25 bismuth fired at 1160° C. ±25.

The preparation of bismuth-substituted yttrium iron garnets was carried out as follows:

Example I

The following oxides were measured out in the quantities indicated:

| | Gram |
|---|---|
| $Bi_2O_3$ | 0.2330 |
| $Y_2O_3$ | 0.2258 |
| $Fe_2O_3$ | 0.3993 |

These are stoichiometric proportions for the composition:

$$(Y_2Bi)Fe_2Fe_3O_{12}$$

and represent a total weight equal to $10^{-3}$ gram-mole. The mixture was fired according to the following schedule and reground and mixed between each firing step:

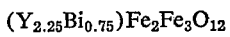

| °C.: | Hours |
|---|---|
| 900 | 1½ |
| 925 | 2 |
| 950 | 18 |
| 980 | 26 |
| 1000 | 17 |

Example II

The following oxides were measured out in the proportions indicated:

| | Gram |
|---|---|
| $Bi_2O_3$ | 0.1748 |
| $Y_2O_3$ | 0.2541 |
| $Fe_2O_3$ | 0.3993 |

These amounts and proportions correspond to $10^{-3}$ mol of the composition:

$$(Y_{2.25}Bi_{0.75})Fe_2Fe_3O_{12}$$

The mixture was ground and fired according to the following schedule:

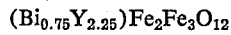

| °C.: | Hours |
|---|---|
| 1000 | ½ |
| 1015 | 18 |
| 1000 | 7 |
| 1000 | 22 |

Again the mixture was reground between each temperature change.

The samples resulting from the preparation technique of these examples possessed a single-phase garnet structure. The maximum firing temperature for the preparation was 1015° C. This compares with 1400° C., the temperature required to form single-phase yttrium iron garnet.

Figure 1:
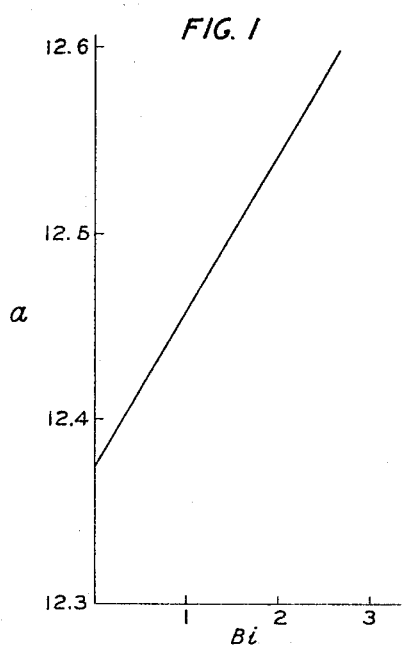
FIG. 1 is a plot of the lattice constant, $a$, vs. composition for bismuth substitutions in yttrium iron garnet.

The variation of lattice constant for the bismuth-containing yttrium iron garnets is shown in FIG. 1 wherein the lattice constant is plotted as ordinate and the composition in terms of ions of bismuth is plotted as abscissa.

Figure 2:
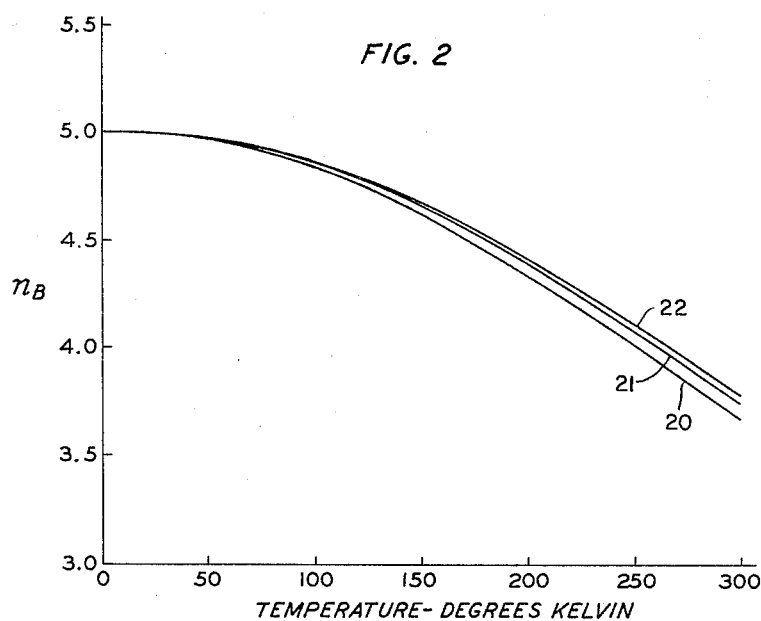
FIG. 2 is a plot of the spontaneous magnetization in Bohr-Magnetons per formula unit vs. temperature for $(BiY_2)Fe_2Fe_3O_{12}$, $(Bi_{0.75}Y_{2.25})Fe_2Fe_3O_{12}$ and $Y_3Fe_2Fe_3O_{12}$

The magnetic properties of bismuth-containing garnets were measured in terms of $n_B$, the spontaneous magnetization in Bohr-Magnetons per formula unit. This data is plotted in FIG. 2 with $n_B$ as ordinate and the composition, again in terms of the number of bismuth ions substituted in yttrium iron garnet, as abscissa. Curve 20 is directed to pure yttrium iron garnet, curve 21 to $$(Bi_{0.75}Y_{2.25})Fe_2Fe_3O_{12}$$

and curve 22 to the composition $(BiY_2)Fe_2Fe_3O_{12}$. As is seen the spontaneous moment per formula unit is not adversely affected by the addition of bismuth, in fact, the magnetization at temperatures above 140° K. is somewhat increased. This suggests that the Curie point is higher for the bismuth garnets and, in fact, the Curie temperature for $(BiY_2)Fe_2Fe_3O_{12}$ was measured and determined to be 591° K., 38° C. higher than the Curie temperature of pure yttrium iron garnet.

While the fundamental behavior of bismuth substituted garnet materials is adequately described by the foregoing treatment directed to substituted yttrium iron garnet, it will be apparent to those skilled in the art that the effects described are characteristic of the presence of this particular ion, bismuth, in a garnet structure. Consequently, these teachings can be applied to the multitude of synthetically-made garnet compositions. These include garnets with other substitutions in the $c$-site for instance, the rare earths, alkaline earth metals, manganese, etc., and mixtures thereof. Substitutions for the iron ions are also known and include such elements as titanium, zirconium, hafnium, magnesium, zinc, gallium, indium, silicon, germanium, tin, chromium, manganese, cobalt, nickel, scandium, aluminum, etc., and mixtures thereof. The iron ions actually occupy two distinct lattice positions, the tetrahedral and octahedral sites, and these substitutions, as well as others known in the art, may be made in either or both sites.

Since the ferrimagnetic garnets are of principal commercial interest, this invention is concerned only with those garnet structures which resemble yttrium iron garnet to the extent that at least two and one-half magnetic iron ions ($Fe^{+3}$) are present in the formula unit. The compounds of this invention can be further restricted to the oxides. Stated more precisely the compounds of interest are garnet structures having the formula:

$$\{Bi_xA_{3-x}\}[Fe_yB_{2-y}](Fe_zC_{3-z})O_{12}$$

where $x$ has a value between 0.05 and 1.5, $y$ has a value from 1 to 2 and $z$ has a value of 0.5 to 3 and at least $2.5-y$, and A, B, and C are ions capable of occupying the dodecahedral, octahedral and tetrahedral sites, as indicated above.

This formula requires that at least 2.5 magnetic iron ions are present which is a condition essential to a garnet structure having a significant magnetic moment.

The obtaining of the unexpected results according to this invention in garnet materials substituted with other elements is demonstrated by the following examples.

*Example III*

The following oxides were measured in the amounts indicated:

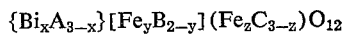

| | Gram |
|---|---|
| $Y_2O_3$ | 0.3105 |
| $Bi_2O_3$ | [1] 0.0612 |
| $Fe_2O_3$ | 0.3194 |
| $Al_2O_3$ | 0.0510 |

[1] 5% excess.

These are stoichiometric quantities for $10^{-3}$ mols of the composition:

$$(Y_{2.75}Bi_{0.25})Fe_4AlO_{12}$$

The excess $Bi_2O_3$ was added because at the firing temperatures and times required, $Bi_2O_3$ vaporizes to the extent shown.

The mixture was ground and fired at 1160° C. for a total period of sixteen and one-half hours. The mixture was cooled and reground after one-half hour and three hours of this firing step.

*Example IV*

The following oxides were measured, ground and mixed in the quantities indicated:

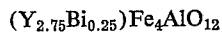

| | Gram |
|---|---|
| $Y_2O_3$ | 0.3105 |
| $Bi_2O_3$ | [1] 0.0612 |
| $Fe_2O_3$ | 0.2795 |
| $Al_2O_3$ | 0.0765 |

[1] 5% excess as in Example III.

These are stoichiometric proportions for $10^{-3}$ mols of the composition:

$$(Y_{2.75}Bi_{0.25})Fe_{3.5}Al_{1.5}O_{12}$$

The mixture was fired according to the schedule:

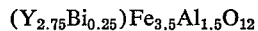

| | Hours |
|---|---|
| 1160° C. | ½ |
| Cooled and reground. | |
| 1160° C. | 3 |
| Cooled and reground. | |
| 1160° C. | 13 |
| Cooled, reground and 0.0060 gram of $Bi_2O$ added. | |
| 1160° C. | 17 |

The added bismuth oxide again corresponds to the amount of loss resulting from evaporation of $Bi_2O_3$.

The materials resulting from the procedures of each of Examples III and IV were found to be single-phase garnets of the indicated composition. These garnets were formed at a temperature of 1160° C. which is about 350° C. lower than is required for the preparation of the corresponding garnets without bismuth.

Figure 3:
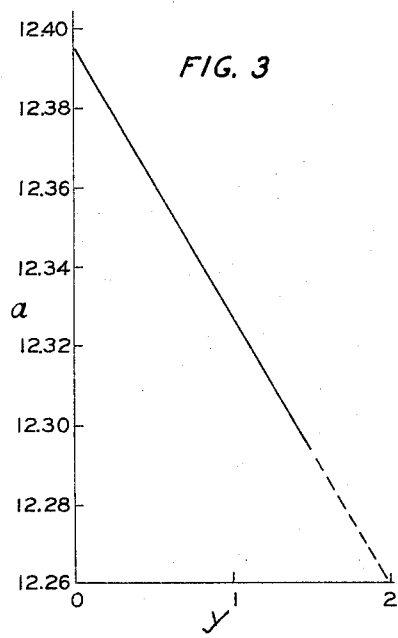
FIG. 3 is a plot of the lattice constant, $a$, vs. composition for bismuth substituted yttrium iron-aluminum garnets.

The lattice constants for bismuth substituted garnets having the composition:

$$(Bi_{0.25}Y_{2.75})Fe_{5-y}Al_yO_{12}$$

are plotted in FIG. 3 with the lattice constant $a$ as ordinate and the value $y$ as abscissa.

Magnetic properties of bismuth-substituted yttrium-iron-aluminum garnets made in accordance with the procedures set forth herein were studied and exemplary data is presented in FIG. 4. The spontaneous magnetization, $n_B$, in Bohr-Magnetons per formula unit is plotted as ordinate with $y$, the number of aluminum ions in the above formula, plotted as abscissa. Curve 40 gives the moment per formula unit at 295° K., while curve 41 is the corresponding 0° K. data.

FIG. 5, on coordinates of spontaneous magnetization in Bohr-Magnetons per formula unit ($n_B$) and temperature in degrees Kelvin, includes data for the garnets of Examples 3 and 4 (curves 50 and 51, respectively), as well as for a third composition (curve 52). Utilizing the data set forth in this figure and the lattice constant values of FIG. 3, is is possible to calculate the minimum values on a volume or weight basis.

*Example V*

The following oxides were measured in the quantities shown:

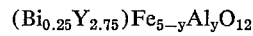

| | Gram |
|---|---|
| $Bi_2O_3$ | 0.2330 |
| $CaCO_3$ | 0.2002 |
| $Fe_2O_3$ | 0.3194 |
| $V_2O_5$ | 0.0910 |

These are stoichiometric quantities for $10^{-3}$ mols of the garnet composition:

$$\{BiCa_2\}[Fe_2](Fe_2V)O_{12}$$

The mixture was ground and fired according to the schedule:

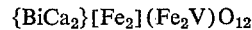

| ° C.: | Hours |
|---|---|
| 975 | ½ |
| 1025 | 16 |
| 1005 | 18 | with regrinding and mixing between each temperature variation.

This procedure resulted in a single-phase garnet composition produced at a temperature not exceeding approximately 180° less than the firing temperature required to form the corresponding non-bismuth-containing garnet.

Various other modifications and extensions of this invention will become apparent to those skilled in the art. All such variations and deviations which basically rely on

What is claimed is:

1. A synthetic garnet composition having the formula:

$$\{Bi_xA'_{3-x}\}[Fe_yB'_{2-6}](Fe_zC'_{3-z})O_{12}$$

where $x$ has a value of 0.05 to 1.5, $y$ has a value of 1 to 2 and $z$ has a value of 0.5 to 3.0 and at least $2.5-y$ and $A'$, $B'$ and $C'$ represent ions which will enter the dodecahedral, octahedral and tetrahedral garnet sites, respectively, and wherein the substitution of bismuth into the dodecahedral site reduces the temperature necessary to produce the garnet phase by at least 50° C.

2. A synthetic garnet composition having the formula:

$$\{Bi_xA'_{3-x}\}[Fe_yB'_{2-6}](Fe_zC'_{3-z})O_{12}$$

where $x$ has a value of 0.5 to 1.5, $y$ has a value of 1 to 2 and $z$ has a value of 0.5 to 3.0 and at least $2.5-y$ and $A'$, $B'$ and $C'$ represent ions which will enter the dodecahedral, octahedral and tetrahedral garnet sites, respectively, and wherein the substitution of bismuth into the dodecahedral site reduces the temperature necessary to produce the garnet phase by at least 50° C.

3. The garnet composition:

$$(Bi_xY_{3-x})Fe_{5-y}Al_yO_{12}$$

where $x$ has a value of 0.05 to 1.5 and $y$ has a value of 0 to 1.5.

4. The garnet composition of claim 3 in which $y$ has a value of zero and $x$ has a value of 0.05 to 0.25.

5. The garnet composition of claim 3 in which $y$ has a value of 0.05 to 1.5.

6. The garnet composition of claim 3 where $x$ has a value of 0.05 to 0.25.

7. A method for preparing a synthetic garnet material having the formula:

$$\{Bi_xA'_{3-x}\}[Fe_yB'_{2-6}](Fe_zC'_{3-z})O_{12}$$

where $x$ has a value of 0.05 to 1.5, $y$ has a value of 1 to 2 and $z$ has a value of 0.5 to 3.0 and at least $2.5-y$ and $A'$, $B'$ and $C'$ represent ions which enter the dodecahedral, octahedral and tetrahedral garnet sites, respectively, which method comprises mixing the stoichiometric proportions of the oxides of each cation and firing the mixture at a temperature below 1350° C. to form a single-phase garnet.

References Cited by the Examiner

UNITED STATES PATENTS 3,117,935  1/1964  Braun et al. _____ 252—62.5
3,156,651  11/1964  Geller _____ 252—62.5

TOBIAS E. LEVOW, *Primary Examiner.*

R. D. EDMONDS, *Assistant Examiner.*